United States Patent
Wagman

(10) Patent No.: US 7,803,873 B2
(45) Date of Patent: Sep. 28, 2010

(54) METHOD FOR MAKING POLYOLEFIN GRAFT POLYMERS HAVING IMPROVED ADHESION PROPERTIES

(75) Inventor: Mark E. Wagman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 283 days.

(21) Appl. No.: 11/135,861

(22) Filed: May 23, 2005

(65) Prior Publication Data
US 2005/0267262 A1 Dec. 1, 2005

Related U.S. Application Data

(60) Provisional application No. 60/575,004, filed on May 27, 2004.

(51) Int. Cl.
C08F 255/00 (2006.01)
C08F 255/02 (2006.01)
C08F 255/04 (2006.01)
C08F 255/08 (2006.01)
C08F 255/10 (2006.01)
C08F 8/12 (2006.01)

(52) U.S. Cl. ........................ 525/70; 525/242; 525/302; 525/333.7

(58) Field of Classification Search .............. 428/425.8, 428/474.4, 500, 516; 525/70, 242, 302, 333.7
See application file for complete search history.

(56) References Cited

U.S. PATENT DOCUMENTS

| | | | |
|---|---|---|---|
| 3,970,534 A | 7/1976 | Fujiwara et al. | |
| 4,011,147 A | 3/1977 | Fujiwara et al. | |
| 4,025,401 A | 5/1977 | Fujiwara et al. | |
| 4,039,630 A * | 8/1977 | Kanagawa et al. | 525/260 |
| 4,510,304 A * | 4/1985 | Hadermann | 528/481 |
| 4,624,992 A | 11/1986 | Milani et al. | |
| 4,810,612 A * | 3/1989 | Ueda et al. | 430/109.31 |
| 4,880,873 A * | 11/1989 | Sagane | 525/61 |
| 5,266,635 A | 11/1993 | Wilkey | |
| 5,384,192 A | 1/1995 | Long et al. | |
| 5,728,431 A | 3/1998 | Bergbreiter et al. | |

FOREIGN PATENT DOCUMENTS

| | | |
|---|---|---|
| CA | 1003145 | 1/1977 |
| DE | 2552136 C2 | 8/1976 |
| EP | 0485983 A1 | 5/1992 |
| EP | 1375543 B1 | 1/2008 |
| GB | 1472232 A | 4/1977 |
| JP | 52004589 | 1/1977 |
| JP | 03-111412 | 5/1991 |
| JP | 2000-239479 | 9/2000 |

OTHER PUBLICATIONS

T. L. Evans et al., Developments in the Chemistry of Oligocyclic Carbonates For Use in Structural Composites, Polymer Preprints, Am. Chem. Soc., vol. 32:176-177, 1991.
Wakabayashi, Hideaki et al., Modified polyolefins with sifficient polarity. JP 2004123778, CAPLUS AN 2004:330245, Apr. 23, 2004.
European Search Report, European Application No. 05756481.7-2109/1749036, PCT/US2005/018888, Aug. 7, 2008.

* cited by examiner

Primary Examiner—Jeffrey C Mullis

(57) ABSTRACT

A solution grafting method for making polyolefin graft polymers by grafting a phenolic ester monomeric compound on olefinic polymers in the presence of a radical initiator in an organic solvent is described. The grafted polymers provide improved adhesion properties, particularly to metal and polyester substrates.

22 Claims, No Drawings

METHOD FOR MAKING POLYOLEFIN GRAFT POLYMERS HAVING IMPROVED ADHESION PROPERTIES

This application claims the benefit of U.S. Provisional Patent Application 60/575004, filed May 27, 2004.

FIELD OF THE INVENTION

The invention relates to the field of polymer chemistry. More specifically, the invention relates to a solution grafting method for making polyolefin graft polymers by grafting a phenolic ester monomeric compound on olefinic polymers in the presence of a radical initiator in an organic solvent.

BACKGROUND OF THE INVENTION

Polyolefin graft polymers formed by grafting phenolic ester monomeric compounds, such as 4-acetoxystyrene, to polyolefins are known. The deacylated derivatives of these polymers have potential value as adhesion promoters and compatibilizers in applications requiring an adhesive bond or a compatible blend between dissimilar materials. These polyolefin graft polymers may be useful as adhesion promoters and compatibilizers with metal and polyester substrates, for which currently available grafted polyolefins, such as those grafted with maleic anhydride, do not perform well. The phenolic ester grafted polyolefins of the invention may also be further derivatized to make other useful products, including polymeric antioxidants and ion exchange media for separations.

Methods for preparing hydroxystyrene and dihydroxystyrene grafted polyolefins for use as ion exchange membranes are known (Fujiwara et al. U.S. Pat. Nos. 4,011,147 and 4,025,401). In those methods, a polyolefin film is subjected to ionizing radiation, such as gamma rays, X-rays, alpha rays, or electron beams, and then immersed in a solution containing a hydroxystyrene or dihydroxystyrene monomer. Alternatively, an acyloxystyrene or a diacyloxystyrene monomer is used. In that case, the grafted acyloxy group is hydrolyzed to convert the acyloxystyrene or diacyloxystyrene to hydroxystyrene or dihydroxystyrene, respectively. Because these methods use a polyolefin film, the grafting is limited to the surface of the film.

Melt grafting methods for making grafted polymers with phenolic ester monomeric compounds are known. For example, Suzuki et al. (JP 52004589) describe a melt grafting method for preparing a grafted hydrocarbon or fluorinated polymer by radical graft polymerization with at least one reactive monomer under high pressure in the presence of a radical initiator. In the melt grafting method, the polymer and the reactive monomer are mixed together in the presence of a radical initiator at a temperature of 150 to 220° C., which renders the material workable in extruders, mixers, etc. Optionally, the grafting may be done in the presence of an organic solvent that dissolves the reactive monomer and the radical initiator, and which swells, but does not dissolve the polymer. The reactive monomers used in that method include aromatic monomers having a polymerizable double bond, such as styrene, hydroxystyrene, dihydroxystyrene, and acyloxystyrene. The graft polymerization reaction requires high pressure, specifically, 50 to 15,000 kg/cm$^2$. Additionally, Wilkey (U.S. Pat. No. 5,266,635) describes a melt grafting method for making hydrogenated styrene/diene copolymers having grafted 4-hydroxystyrene groups. The hydrogenated styrene/diene copolymers are grafted with 4-acetoxystyrene, which is converted to 4-hydroxystyrene by aminolysis, hydrolysis, or saponification. The grafted polymers are used to improve the low temperature impact strength of polycarbonates when the phenolic groups are reacted with the polycarbonates.

Methods for solution grafting of polyolefins with vinyl monomers in the presence of radical initiators are also known. However, these methods have not been used to graft phenolic ester monomeric compounds on polyolefins. For example, Ryoji et al. (JP 2000239479) describe a solution grafting method for preparing graft ethylene polymers using vinyl monomers, such as styrene, acrylonitrile, acrylic acid, and methacrylic acid, using a radical initiator. In that method, the polymer, vinyl monomer, and the radical initiator are dissolved in an inert solvent and the graft polymerization reaction is carried out at 50 to 180° C. in a plug flow reactor. Similarly, Fournier et al. (CA 1003145) describe a solution method for making graft polymers. In that method, rubbery ethylene-propylene copolymers are grafted with vinyl monomers such as styrene, vinyl chloride, methyl methacrylate, acrylonitrile and mixtures thereof, in the presence of a radical initiator in an organic solvent.

Therefore, the need exists for adhesion promoters and compatibilizers in applications requiring an adhesive bond or a compatible blend between dissimilar materials, particularly with metal and polyester substrates.

Applicants have solved the stated problem by providing a solution grafting method for making polyolefin graft polymers by grafting a phenolic ester monomeric compound on olefinic polymers in the presence of a radical initiator in an organic solvent. These grafted polymers provide improved adhesion to metal and polyester substrates.

SUMMARY OF THE INVENTION

The invention relates to methods for the production of graft polymers having improved adhesion properties. Specifically the invention provides a process for making polyolefin graft polymers having improved adhesion properties comprising the steps of:

a) contacting at least one polyolefin dissolved in a solvent with:

i) a first phenolic ester monomeric compound having the structure as shown in Formula (I):

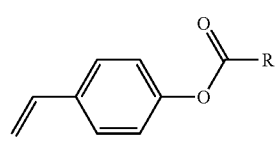

Formula (I)

wherein R=an alkyl group having from 1 to 20 carbon atoms, or phenyl; and (ii) a radical initiator to form a reaction mixture; for a time and at a temperature sufficient to permit polymerization and the formation of a polyolefin graft polymer; and b) optionally isolating the polyolefin graft polymer of (a)

In an alternate embodiment the phenolic ester pendant group in the polymer may be optionally deacylated to a deacylated product.

Similarly, in another embodiment, the process may additionally comprise a second monomer which may or may not be a phenolic ester.

In a specific embodiment the invention provides a process for making polyolefin graft polymers having improved adhesion properties comprising the steps of:
a) contacting at least one polyolefin in a first solvent with a first phenolic ester monomeric compound having the structure as shown in Formula (I):

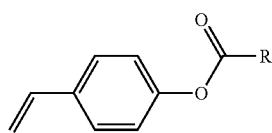

Formula (I)

wherein R=an alkyl group having from 1 to 20 carbon atoms, or phenyl, to form a reaction mixture;
b) contacting the reaction mixture of step (a) with a radical initiator selected from the group consisting of benzoyl peroxide, dicumyl peroxide, 2,5-dimethyl-2,5-di-(t-butylperoxy)hexane, α,α'-bis(t-butylperoxy)diisopropylbenzene, di-t-amyl peroxide, di-t-butyl peroxide, 2,5-dimethyl-2,5-di-(t-butylperoxy)hexyne-3,1,1-di-(t-butylperoxy)-3,3,5-trimethyl-cyclohexane, n-butyl 4,4-bis(t-butylperoxy)valerate, and ethyl 3,3-di-(t-amylperoxy)butyrate;
c) heating the mixture of step (b) from about 60° C. to about 180° C. for a time sufficient to permit polymerization and the formation of a polyolefin graft polymer comprising a phenolic ester;
d) cooling the mixture of step (c) to a temperature of less than about 70° C.;
e) precipitating the mixture of step (d) in a second solvent;
f) separating the first solvent and the second solvent from the precipitated mixture of step (e); and
g) optionally deacylating the phenolic ester comprised within the polyolefin graft polymer.

In another embodiment the invention provides a coated substrate comprising a polyolefin graft polymer coating comprising a phenolic ester monomeric compound grafted to a polyolefin, wherein the phenolic ester monomeric compound has the structure shown in Formula (I):

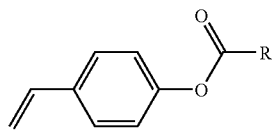

Formula (I)

wherein R=an alkyl group having from 1 to 20 carbon atoms, or phenyl.

DETAILED DESCRIPTION OF THE INVENTION

The invention relates to a method for the production of grafted polyolefin polymers comprising a phenolic ester monomeric compound grafted on olefinic polymers. The process is run in solution phase in the presence of a radical initiator. Coated substrates comprising the polymer compositions of the invention are also provided.

The polyolefin graft polymers of the invention and the deacylated derivatives thereof are particularly useful as adhesion promoters and compatibilizers in applications requiring an adhesive bond or a compatible blend between dissimilar materials such as a polyolefin to a metal or polyester, for example. The phenolic ester grafted polyolefins of the invention may also be further derivatized, for example by sulfonation, to make other useful products, including polymeric antioxidants and ion exchange media for separations.

The following definitions are used herein and should be referred to for interpretation of the claims and the specification:

"p" means para.

"pAS" is the abbreviation used for para-acetoxystyrene which is also represented as p-acetoxystyrene, or 4-acetoxystyrene.

The term "improved adhesion properties" as it refers to a graft polymer of the invention means that the graft polymer imparts increased peel strength, compared to the ungrafted polymer, when used as a tie layer between two dissimilar materials that have poor peel strength in the absence of the tie layer. The increase in peel strength varies depending on the substrate used. Typically, the peel strength obtained with the graft polymer of the invention is from about 2 to 30-fold higher than that obtained with the ungrafted polymer.

The term "polyolefin" means a polymer comprised of acyclic and cyclic hydrocarbons having one or more carbon-carbon double bonds, apart from the formal ones in aromatic compounds. The class olefins subsumes alkenes and cycloalkenes and the corresponding polyenes.

The term "radical initiator" means a substance comprising a free radical (a molecular entity such as .$CH_3$, .$SnH3$, .Cl or RO., possessing an unpaired electron) which, when added to a polymerization reaction mixture, serves to initiate the reaction.

The term "alkyl" refers to a straight or branched chain hydrocarbon containing no unsaturation.

The term "peel strength" has the units g/cm and is defined herein as the average load per unit width of bondline required to separate progressively a flexible member from a rigid member or another flexible member.

The term "wt %" refers to percent by weight.

The term "wt/vol %" refers to weight to volume percent.

The term "polar aprotic" as applied to solvents of the invention refers to solvents characterized by molecules having sizable permanent dipole moments and that are incapable of acting as a labile proton donor or acceptor.

All ranges given herein include the end of the ranges and also all the intermediate range points.

The invention relates to grafted polyolefin polymers comprising a phenolic ester monomeric compound grafted on olefinic polymers. The process is typically run in solution phase in the presence of a radical initiator. Optionally, the pendant phenolic ester grafted on the polymer may be derivatized by deacylation. The resulting products have improved adhesion properties and are useful for coating substrates.

The process proceeds by contacting at least one polyolefin with a phenolic ester monomeric compound. Phenolic ester monomers of the invention have the general formula:

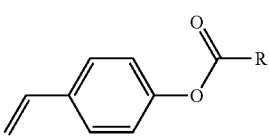

Formula (I)

wherein R is an alkyl group having from 1 to 20 carbon atoms, or phenyl. Phenolic esters of the invention may be synthesized by methods well known in the art. For example, the alkyl styrene esters may be prepared using the method described by Overberger (U.S. Pat. No. 2,687,422, and *J. Amer. Chem. Soc.* 72:1200-1202 (1950)). The styrene ester wherein R=H (p-formylstyrene) may be prepared via the decarboxylation of p-formylcinnamic acid, as described by Wiley et al. (*J. Amer. Chem. Soc.* 71:2429-2431 (1949)). The styrene ester wherein R=phenyl (p-vinylphenol benzoate) may be prepared via the base-catalyzed addition of benzoyl chloride to p-hydroxystyrene, as described by Hattori et al. (*J. Amer. Chem. Soc.* 81:4424-4427 (1959)).

In a preferred embodiment, the substrate is p-acetoxystyrene, wherein R is $CH_3$. Para-acetoxystyrene (pAS) may be obtained in a number of ways. For example, pAS is available commercially in high purity from companies such as DuPont Electronic Polymers (Dallas, Tex.), Aldrich (Milwaukee, Wis.), Lancaster Synthesis (Pelham, N.H.), and TCI America (Portland, Oreg.). Para-acetoxystyrene may also be synthesized according to the method described by Corson et al. (*J. Org. Chem.* 23:544 (1958)). Additionally, pAS may be obtained from pHS using the method described by Sounik et al. in U.S. Pat. No. 5,463,108. The pHS used as the starting material in that reaction may be produced by fermentation using a recombinant microorganism, as described by Ben-Bassat et al. (copending and commonly owned U.S. patent application Ser. No. 10/439,478, U.S. patent application Publication No. 2004-0018600, and U.S. patent application Ser. No. 10/824,237).

The amount of phenolic ester monomer used in the reaction may vary depending on the degree of grafting desired. Typically, the phenolic ester monomer is present in the reaction mixture at a concentration of about 4 wt % to about 20 wt % relative to the weight of the polyolefin polymer.

Similarly, polyolefins useful in the present invention are commercially available and may be obtained from a variety of sources including E. I. du Pont de Nemours Co., Wilmington Del.; Dow Chemical Co., Midland, Mich.; and Exxon-Mobil, Irving Tex. Polyolefins may be supplied either as polymer or copolymer mixes. A non-limiting list of suitable polyolefin polymers and copolymers includes polyethylene, ethylene/propylene copolymer, ethylene/butene copolymer, ethylene/hexene copolymer, ethylene/octene copolymer, polypropylene, ethylene/methyl acrylate copolymer, ethylene/acrylic acid copolymer, ethylene/methacrylic acid copolymer, and ethylene/vinyl acetate copolymer.

The amount of polyolefin used in the reaction may vary depending on several factors, including the solubility of the polyolefin in the solvent used and the viscosity of the resulting solution. The minimum effective concentration of polyolefin is a practical consideration because the amount of product formed is related to the amount of polyolefin used in the reaction. Consequently, if the amount of polyolefin used is very low, very small amounts of the product will be produced. The amount of polyolefin to be used in any given reaction may be readily determined by one skilled in the art. Typically, the concentration of polyolefin is about 10 wt/vol %.

Optionally, more than one monomeric compound may be grafted onto the polyolefins of the invention. This additional monomer may be a different phenolic ester or may be a completely different compound. Monomers particularly suitable for this purpose include but are not limited to styrene, and diene monomers (available from Lyondell Chemical Co., Houston, Tex., and Huntsman, Salt Lake City, Utah), and acrylate monomers, and methacrylate monomers (available from BASF Corporation, Mount Olive, N.J.; Atofina Chemicals, Inc., Philadelphia, Pa. or Rohm and Haas, Philadelphia, Pa.).

It is preferred that a radical initiator be used in the reaction to promote polymerization. Radical initiators are common and well known in the art and a variety may be suitable for the present purpose including but not limited to benzoyl peroxide, dicumyl peroxide, 2,5-dimethyl-2,5-di-(t-butylperoxy) hexane, α,α'-bis(t-butylperoxy)diisopropylbenzene, di-t-amyl peroxide, di-t-butyl peroxide, 2,5-dimethyl-2,5-di-(t-butylperoxy)hexyne-3, 1,1-di-(t-butylperoxy)-3,3,5-trimethyl-cyclohexane, n-butyl 4,4-bis(t-butylperoxy) valerate, and ethyl 3,3-di-(t-amylperoxy)butyrate. The skilled artisan will understand how to determine the concentration of radical initiator by means well known in the art. Preferred concentrations in the present reaction system will range from about 0.1 wt % to about 4.0 wt % relative to the weight of the polyolefin polymer.

Radical initiators are commercially available from Atofina Chemicals Inc., Philadelphia, Pa. and their use is fully described in Ropot et al., "Macromolecular radical initiators in the synthesis of block and graft copolymers". *Revue Roumaine de Chimie* (1995), 40(9), 937-55.

Typically the present reaction is accomplished in solution phase wherein the polyolefin is first dissolved in a first solvent prior to the contacting with the phenolic ester monomer. Suitable solvents are inert organic solvents, including aromatic hydrocarbons such as chlorobenzene and dichlorobenzene, halogenated hydrocarbons, and polar aprotic solvents such as dimethyl acetamide and dimethyl formamide, where chlorobenzene is preferred.

Subsequent to the formation of the grafted polymer, the polymer may be added to a second solvent where it is precipitated for extraction. Typical second solvents include, but are not limited to, alcohols (e.g. methyl alcohol, ethyl alcohol, propyl alcohol, isopropyl alcohol, butyl alcohol, 2-butyl alcohol, n-pentyl alcohol, and n-hexyl alcohol), ethers, ketones, esters, and amides and mixtures thereof, where methanol and acetone are preferred. Unreacted monomer and initiator, and ungrafted homopolymer of the phenolic ester may be removed from the grafted polymer by dissolving the polymer in a solvent such as tetrahydrofuran and heating under reflux. The grafted polymer is then precipitated by slowly cooling the solution. The precipitated polymer is filtered and washed with fresh solvent.

Reaction conditions for the instant polymer grafting process may vary, however, typically the reaction will be run at temperatures of at least about 60° C., where temperatures of about 60° C. to about 180° C. are particularly suitable. Similarly the reaction may be terminated by cooling the reaction mixture to temperatures of less than about 70° C. The polymerization reaction may run for any length of time, however a time of at least about 6 hours is typical. Optionally, the reaction may be run under pressure, often under an inert gas such as nitrogen. Additionally, other components may be added to the reaction mixture as are commonly used in the art, including antioxidants, UV stabilizers, and process aids (e.g. lubricants) and the like. The process is quite efficient and yields in excess of at least about 90% are typical.

The present process will be expected to produce polymer compositions having a general composition comprising a phenolic monomer grafted to a polyolefin wherein the weight ratio of polyolefin to phenolic monomer is from about 5:1 to about 100:1.

The process of the invention produces a polyolefin graft polymer comprising phenolic ester pendant groups. In one preferred embodiment the pendant phenolic ester may be derivatized by deacylation to produce a deacylated product. In this fashion pendants of p-acetoxystyrene may be deacylated to hydroxystyrene for example.

Methods of deacylation are common and well known in the art and include but are not limited to saponification, acid-catalyzed transesterification, and base-catalyzed transesterification (see for example Gupta et al., U.S. Pat. No. 4,898,916; Elmore et al., U.S. Pat. No. 4,689,371; and Elmore et al., U.S. Pat. No. 4,678,843). Within the context of the present invention polyolefin graft polymer may be reacted with a strong base, such as NaOH at low temperature and then contacted with a strong acid (HCl) where the deacylated product is precipitated and then isolated.

The polymers of the invention have adhesion properties which are superior to similar compounds in the art when coated on substrates. The present polymers may be used to coat a variety of substrates and to create laminates comprised of materials including but not limited to polymers (e.g. high density polyethylene, low density polyethylene, polyethylene terephthalate, fluoropolymers, Nylon, liquid crystalline polymers) and metals such as steel, copper, and aluminum. Laminate, as used herein, includes multilayer structures comprising the polyolefin graft polymer as a film or sheet, as well as multilayer coextruded structures wherein the substrate and the polyolefin graft polymer are brought together in a molten state. The polyolefin graft polymer may also be used as a tie layer to bond two different polymer films together, for example polyethylene and poly(ethylene terephthalate), or polyethylene and liquid crystalline polymer. Additionally, the polyolefin graft polymers of the invention are effective adhesion promoters when used in a blend with at least one other polyolefin, such as polyethylene, ethylene/propylene copolymer, ethylene/butene copolymer, ethylene/hexene copolymer, ethylene/octene copolymer, polypropylene, ethylene/methyl acrylate copolymer, ethylene/acrylic acid copolymer, ethylene/methacrylic acid copolymer, or ethylene/vinyl acetate copolymer. The blends may be prepared in solution, as described in Examples 8-13, 19 and 23, or in the melt using methods known in the art. Blends comprising as little as 5 wt % of the polyolefin graft polymers exhibit significantly improved adhesion properties compared to the ungrafted polyolefin. The peel strength of the present polymers when coated on the appropriate substrate ranges from about 30 g/cm to about 3000 g/cm.

Additionally, it is well within the scope of the invention to prepare the coated substrates and laminates described above using polyolefin graft polymers, comprising a phenolic monomer grafted to a polyolefin, which are prepared using other methods known in the art, such as melt grafting (for example see Wilkey et al. U.S. Pat. No. 5,266,635) and grafting using ionizing radiation (for example see Fujiwara et al. U.S. Pat. No. 4,011,147). Polyolefin graft polymers prepared by these methods would be expected to provide similar improved adhesion properties as the graft polymers prepared using the solution grafting method of the invention.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "h" means hour(s), "s" means second(s), "mL" means milliliter(s), "L" means liter(s), "μL" means microliter(s), "cm" means centimeter(s), "$cm^{-1}$" means reciprocal centimeter(s), "mm" means millimeter(s), "μm" means micrometer(s), "mol" means mole(s), "mmol" means millimole(s), "g" means gram(s), "mg" means milligram(s), "Mw" means weight-average molecular weight, "Mn" means number-average molecular weight, "M" means molar concentration, "N" means normality, "THF" means tetrahydrofuran, "THF-d8" means deuterated tetrahydrofuran, "psi" means pounds per square inch, "v/v" means volume to volume ratio, "wt %" means percent by weight, "mol %" means mole percent, "$^1$H NMR" means proton nuclear magnetic resonance spectrometry, "FTIR" means Fourier transform infrared spectrophotometry.

"LCP" is the abbreviation for "liquid crystalline polymer".

"HDPE" is the abbreviation for "high density polyethylene"

LDPE is the abbreviation for "low density polyethylene"

LCP 400 was obtained from the E. I., du Pont de Nemours Company and it's preparation is fully described in U.S. patent application Publication 2004/0058092, incorporated herein by reference.

Example 1

Grafting of 4-Acetoxystyrene on Polyethylene

The purpose of this Example was to prepare a polyolefin graft polymer by grafting 4-acetoxystyrene on low-density polyethylene.

Polyethylene A, a branched low density polyethylene, having a density of 0.906, a melt index of 2.25, a Mw of 35,000, and a Mn of 7,700, was obtained from Aldrich, Milwaukee, Wis. (Aldrich #42-779,9). Polyethylene A (50 g) was dissolved in 500 mL of chlorobenzene at 125° C. under a nitrogen atmosphere with stirring. Then, 10 g of 4-acetoxystyrene, obtained from DuPont Electronic Polymers, Dallas Tex., was added. After 5 min, a premixed solution containing 2 g of t-butyl peroxide initiator in 20 mL of chlorobenzene was added drop-wise over a 60 min period. Stirring and heating at 125° C. were continued for 6 h, and then the heat was removed. The next day, the mixture was heated to completely redissolve the grafted polymer, and the polymer was precipitated by pouring the solution into 1 L of methanol. The polymer was filtered and then washed with fresh methanol. After air drying for 30 min, the polymer was dried in a vacuum oven with nitrogen purge overnight at 75° C. The grafted polymer had a net weight of 55.84 g. An FTIR spectrum of a 64 μm pressed film of this polymer showed a strong band of 1.7 absorbance units at 1767 $cm^{-1}$, consistent with an acetoxy carbonyl group, in addition to bands characteristic of polyethylene. $^1$H NMR in THF-d8 indicated that the amount of acetoxystyrene present in the polymer sample was 1.18 mol %.

To remove unreacted monomer and initiator, and ungrafted acetoxystyrene homopolymer, 5 g of the grafted polymer was dissolved in 50 mL of tetrahydrofuran under reflux at 67° C. Upon slow cooling, the grafted polymer precipitated from the solution. The polymer was filtered and then washed with a small amount of fresh tetrahydrofuran. After air drying, the polymer was dried in a vacuum oven with nitrogen purge overnight at 80° C. The net weight of the polymer was 4.74 g. An FTIR spectrum of a 25 μm pressed film of this extracted polymer showed a strong band of 0.9 absorbance units at 1767 $cm^{-1}$, consistent with an acetoxy carbonyl group from the grafted monomer, in addition to bands characteristic of polyethylene.

Example 2

Deacetylation of the 4-Acetoxystyrene on Polyethylene Grafted Polymer

The purpose of this Example was to deacetylate the 4-acetoxystyrene on the polyethylene grafted polymer prepared in Example 1 to give a hydroxystyrene grafted polyethylene.

The grafted polymer of Example 1 (30 g) was dissolved in 500 mL of tetrahydrofuran at reflux. Fifty milliliters of a 3 N aqueous sodium hydroxide solution was added, turning the liquid milky white. The mixture was held at 60° C. with stirring for 4 h. Then, the mixture was poured into 3 L of 10% aqueous hydrochloric acid and stirred slowly for 2 h. The solids were filtered and washed several times with deionized water until the wash water reached a pH of 6. After air drying, the solids were dried in a vacuum oven with nitrogen purge for 2 days at 50° C. The net weight of the solids was 29.3 g. The FTIR spectrum of a KBr pellet of this product showed only a small band due to acetoxy carbonyl and a new broad band at 3415 cm$^{-1}$ due to hydroxyl. $^1$H NMR in THF-d8 indicated that 76% of the acetoxystyrene groups had been deacetylated to hydroxystyrene by this procedure.

Examples 3-4

Peel Strength Testing of the Adhesion of Grafted Polyethylene A to a Poly(Ethylene Terephthalate) Film The purpose of these Examples was to demonstrate the improved adhesion of the grafted, deacetylated Polyethylene A, compared to unmodified polyethylene A.

Polyethylene A and the grafted, deacetylated Polyethylene A, from Example 2, were each pressed into 12.7 cm×12.7 cm, 51 to 102 μm thick films in a lab press at 160° C. using a 3 min preheat, followed by 1 min at 20,000 psi pressure, and slow cooling in the press. A heat sealer was used to bond each of these films to a 51 μm thick oriented poly(ethylene terephthalate) film (Mylar® PET, E.I. du Pont de Nemours and Co., Wilmington, Del.) over a 2.5 cm wide band. The heat seal conditions used are specified in Table 1. After heat sealing at the given temperature, the samples were allowed to cool to room temperature before the peel testing was done.

Five 1.3 cm wide strips were then cut from each bonded sandwich for peel testing [ASTM D 1876]. A T-peel test was conducted by placing the film ends away from the bonded section into the jaws of the Instron tester and pulling at a crosshead speed of 30.5 cm/min until the sample failed completely by debonding or tearing. The peel strength was taken as the average stress achieved while the sample was fully under load. The results of the peel strength tests are summarized in Table 1. The peel strength values in the table are the averages of measurements on multiple samples.

TABLE 1

Results of Peel Strength Measurements

| Example | Polymer | Temperature ° C. | Dwell Time s | Peel Strength g/cm |
|---|---|---|---|---|
| Example 3 | grafted polyethylene of Example 2 | 163 | 20 | 86.2 |
| | grafted polyethylene of Example 2 | 204 | 20 | 75.6 |
| | grafted polyethylene of Example 2 | 246 | 20 | 130.7 |
| Example 4, Comparative | Polyethylene A | 163 | 20 | 2.8 |
| | " | 204 | 20 | 13.8 |
| | " | 246 | 20 | 9.8 |

The adhesion of Polyethylene A to Mylar® PET was almost too low to measure. By contrast, the grafted, deacetylated polyethylene A of Example 2 had significant adhesion to PET. Moreover, several of the Example 2 polymer films tore upon Instron testing, suggesting that the adhesion of these films to PET was even greater than indicated by the peel strength.

Example 5

Grafting of 4-Acetoxystyrene on Polyethylene

The purpose of this Example was to prepare a polyolefin graft polymer by grafting 4-acetoxystyrene on low density polyethylene.

Polyethylene A (25 g) was dissolved in 250 mL of chlorobenzene at 125° C. under a nitrogen atmosphere with stirring. Then, 1 g of 4-acetoxystyrene (DuPont Electronic Polymers, Dallas, Tex.) was added. After 5 min, a premixed solution containing 1 g of t-butyl peroxide initiator in 10 mL of chlorobenzene was added drop-wise over a 50 min period. Stirring and heating at 125° C. were continued for 6 h, and then the heat was removed. The next day, the mixture was heated to completely redissolve the grafted polymer, and the polymer was precipitated by pouring the solution into 1 L of methanol. The polymer was filtered and then washed with fresh methanol. After air drying, the polymer was dried in a vacuum oven with nitrogen purge over the weekend at 70° C. The grafted polymer had a net weight of 25.54 g.

To remove unreacted monomer and initiator, and ungrafted acetoxystyrene homopolymer, 19.5 g of the grafted polymer was dissolved in 210 mL of tetrahydrofuran under reflux at 67° C. Upon slow cooling, the grafted polymer precipitated from the solution. The polymer was filtered and then washed with a small amount of fresh tetrahydrofuran. After air drying, the polymer was dried in a vacuum oven with nitrogen purge overnight at 80° C. The net weight of the polymer was 18.65 g. An FTIR spectrum of a 25 μm pressed film of this extracted polymer showed a band of approximately 0.1 absorbance units at 1771 cm$^{-1}$, consistent with an acetoxy carbonyl group from the grafted monomer, in addition to bands characteristic of polyethylene. By $^1$H NMR in THF-d8, the level of acetoxystyrene in this polymer was found to be 0.28 mol %.

Example 6

Deacetylation of the 4-Acetoxystyrene on Polyethylene Grafted Polymer

The purpose of this Example was to deacetylate the 4-acetoxystyrene on the polyethylene grafted polymer prepared in Example 5 to give a hydroxystyrene grafted polyethylene.

The grafted polymer prepared in Example 5 (18.4 g) was dissolved in 500 mL of tetrahydrofuran at reflux. Fifty milliliters of a 3 N aqueous sodium hydroxide solution was added, turning the liquid milky white. The mixture was held at 60° C. with stirring for 6 h. Then, the mixture was poured into 3 L of 10% aqueous hydrochloric acid and stirred slowly for 2 h. The solids were filtered and washed several times with deionized water until the wash water reached a pH of 6. After air drying, the solids were dried in a vacuum oven with nitrogen purge overnight at 65 to 70° C. The net weight of the solids was 17.8 g. The FTIR spectrum of a 20 μm pressed film showed no band due to acetoxy carbonyl and a new broad band at 3415 cm$^{-1}$ due to hydroxyl. $^1$H NMR in THF-d8 indicated that all of the acetoxystyrene groups had been deacetylated to hydroxystyrene by this procedure.

Example 7

Peel Strength Testing of the Adhesion of Grafted Polyethylene A to a Poly(Ethylene Terephthalate) Film The purpose of this Example was to demonstrate the improved adhesion of the grafted, deacetylated Polyethylene A.

The grafted, deacetylated Polyethylene A of Example 5 was pressed into 12.7 cm×12.7 cm, 51 μm thick films in a lab press at 160° C. using a 3 min preheat, followed by 1 min at 20,000 psi pressure, and slow cooling in the press. A heat sealer was used to bond each of these films to a 51 μm thick oriented poly(ethylene terephthalate) film (Mylar® PET) over a 2.54 cm wide band. Heat seal conditions are specified below. Five 1.3 cm wide strips were then cut from each bonded sandwich for peel testing. A T-peel test was conducted as described in Examples 3 and 4. The peel strength was taken as the average stress achieved while the sample was fully under load. The reported values are averages of measurements on three samples. A sandwich heat sealed at 177° C. with a 1 s dwell time had an average peel strength of 372 g/cm. A sandwich heat sealed at 177° C. with a 2 s dwell time had an average peel strength of 507 g/cm.

Examples 8-12

Effect of Blending Grafted and Ungrafted Polyethylene on Adhesion to Poly(Ethylene Terephthalate)

The purpose of these Examples was to demonstrate the effect of blending grafted Polyethylene A and ungrafted Polyethylene A on the adhesion to poly(ethylene terephthalate), and comparing the adhesion to that obtained with ungrafted Polyethylene A.

Blends of Polyethylene A with the grafted, deacetylated Polyethylene A of Example 6 were prepared by dissolving each polymer in hot tetrahydrofuran, blending the solutions in specific proportions, cooling to precipitate the polymer, and drying in a vacuum oven overnight at 68° C. The blends also included 1% Irganox® 1010 antioxidant (Ciba Geigy, Tarrytown N.Y.), based on the weight of the grafted, deacetylated polymer.

Samples for peel testing were prepared as described in Example 7, using a heat seal condition of 177° C. with a 2 s dwell time. The results are shown in Table 2. As can be seen from the data, a relatively small amount of the grafted polymer in the blend (i.e., 5 wt %) resulted in a significant improvement in peel strength compared to the ungrafted polyethylene.

TABLE 2

Results of Peel Strength Measurements of Blends of Grafted and Ungrafted Polyethylene on Poly(ethylene terephthalate)

| Example | Polyethylene A (wt %) | Grafted, deacetylated Polyethylene A (wt %) | Average Peel Strength (g/cm) |
|---|---|---|---|
| Example 8 | 0 | 100 | 195 |
| Example 9 | 50 | 50 | 262 |
| Example 10 | 80 | 20 | 154 |
| Example 11 | 90 | 10 | 219 |
| Example 12 | 95 | 5 | 203 |
| Example 13, Comparative | 100 | 0 | 16 |

Example 14

Grafting of 4-Acetoxystyrene on Polyethylene

The purpose of this Example was to prepare a polyolefin graft polymer by grafting 4-acetoxystyrene on low density polyethylene.

Polyethylene A (50 g) was dissolved in 500 mL of chlorobenzene at 125° C. under a nitrogen atmosphere with stirring. Then, 2 g of 4-acetoxystyrene (DuPont Electronic Polymers, Dallas Tex.) in 10 mL of chlorobenzene was added. After 5 min, a premixed solution containing 2 g of t-butyl peroxide initiator in 20 mL of chlorobenzene was added dropwise over a 60 min period. Stirring and heating at 125° C. were continued for 6 h, and then the heat was removed. After 3 days at room temperature, the mixture was heated to completely redissolve the grafted polymer, and the polymer was precipitated by pouring the solution into 1.5 L of methanol. The polymer was filtered and then washed with fresh methanol. After air drying, the polymer was dried in a vacuum oven with nitrogen purge overnight at 75° C. The grafted polymer had a net weight of 49.21 g.

To remove unreacted monomer and initiator, and ungrafted acetoxystyrene homopolymer, 48 g of the grafted polymer was dissolved in 800 mL of tetrahydrofuran in a 1 L resin kettle under reflux for approximately 1 h. Upon placing the resin kettle in ice water, the grafted polymer precipitated from the solution. The polymer was filtered and then washed with 150 mL of fresh tetrahydrofuran. A solution containing 0.5 g of Irganox® 1010 antioxidant in 25 g of tetrahydrofuran was spread over the wet polymer cake. After air drying, the polymer was dried in a vacuum oven with nitrogen purge for 48 h at 65° C. The net weight of the polymer was 48.61 g. An FTIR spectrum of a 15 μm thick pressed film of this extracted polymer showed a band of approximately 0.09 absorbance units at 1771 cm$^{-1}$, consistent with an acetoxy carbonyl group from the grafted monomer, in addition to bands characteristic of polyethylene. By $^1$H NMR in THF-d8, the level of acetoxystyrene in this polymer was found to be 0.29 mol %.

Example 15

Deacetylation of 4-Acetoxystyrene on Polyethylene Grafted Polymer

The purpose of this Example was to deacetylate the 4-acetoxystyrene on the polyethylene grafted polymer prepared in Example 14 to give a hydroxystyrene grafted polyethylene.

The grafted, extracted polymer from Example 14 (38 g) was dissolved in 800 mL of tetrahydrofuran at reflux. Then, 100 mL of a 3 N aqueous sodium hydroxide solution was added, turning the liquid viscous and milky white. The mixture was held at 67° C. with stirring for 5 h. The mixture was poured into 3 L of 10% aqueous hydrochloric acid and stirred slowly for 2 h. The solids were filtered and washed several times with deionized water until the wash water reached a pH of 6. After air drying, the solids were dried in a vacuum oven with nitrogen purge at 70° C. for 48 h. The net weight of the solids was 37.22 g. $^1$H NMR in THF-d8 indicated that all of the acetoxystyrene groups had been deacetylated to hydroxystyrene by this procedure.

Examples 16-19

Peel Strength Testing of the Adhesion of High Density Polyethylene/Tie Layer/PET Sandwiches The purpose of these Examples was to demonstrate the improved adhesion between high density polyethylene (HDPE) and PET using tie layers containing grafted polyethylene, compared to ungrafted polyethylene.

Polyethylene A, the grafted polymer from Example 14, and a blend of 95% Polyethylene A and 5% of the grafted, deacetylated polymer from Example 15 (blended in tetrahydrofuran solution) were each melt pressed to approximately 64 μm thick films. Each of these films was included in a sandwich consisting of a 89 μm thick extruded film of Alathon® 6060 HDPE (Equistar, Houston, Tex.), one of the above melt pressed films as tie layer, and a 51 μm thick film of Mylar® PET. Each sandwich was heat sealed at 191° C. with a 2 s dwell time, and then peel tested, as described in Examples 3 and 4. The results of the peel strength measurements are given in Table 3. Without a tie layer resin, the HDPE and PET films failed to heat seal. The acetoxystyrene-grafted polymer dramatically improved adhesion, both before and after deacetylation of the acetoxy group. Very little grafted polymer was needed to give the adhesion improvement over that obtained with the ungrafted Polyethylene A.

TABLE 3

Results of Peel Strength Measurements of HDPE/Tie Layer/PET Sandwiches

| Example | Tie Layer | Average Peel Strength (g/cm) |
|---|---|---|
| Example 16, Comparative | Polyethylene A | 2.8 |
| Example 17 | grafted polyethylene from Example 14 | 162 |
| Example 18 | grafted, deacetylated polyethylene from Example 15 | 90.6 |
| Example 19 | 95% Polyethylene A, 5% grafted, deacetylated polyethylene from Example 15 | 124 |

Examples 20-23

Peel Strength Testing of the Adhesion of High Density Polyethylene/Tie Layer/LCP Sandwiches The purpose of these Examples was to demonstrate the improved adhesion between HDPE and liquid crystalline polymer (LCP) using tie layers containing grafted polyethylene, compared to ungrafted polyethylene.

Polyethylene A, the grafted polymer from Example 14, the grafted deacetylated polymer from Example 15, and a blend of 95% Polyethylene A and 5% of the grafted, deacetylated polymer from Example 15 (blended in tetrahydrofuran solution) were each melt pressed to approximately 64 μm thick films. Each of these films was included in a sandwich consisting of a 89 μm thick extruded film of Alathon® 6060 HDPE (Equistar, Houston, Tex.), one of the above melt pressed films as tie layer, and a 94 μm thick extruded film of LCP 400 (E. I du Pont de Nemours Co., Wilmington, Del.). Each sandwich was heat sealed at 191° C. with a 2 s dwell time and then peel tested, as described in Examples 3 and 4. The results of the peel strength measurements are given in Table 4. Without a tie layer resin, the HDPE and LCP films failed to heat seal. Polyethylene A heat sealed only to the HDPE. The acetoxystyrene-grafted polymer dramatically improved adhesion, both before and after deacetylation of the acetoxy group. Very little grafted polymer was needed to produce adhesion.

TABLE 4

Results of Peel Strength Measurements of HDPE/Tie Layer/LCP Sandwiches

| Example | Tie Layer | Average Peel Strength (g/cm) |
|---|---|---|
| 20, Comparative | Polyethylene A | 0 |
| 21 | grafted polyethylene from Example 14 | 512 |
| 22 | grafted, deacetylated polyethylene from Example 15 | 516 |
| 23 | 95% Polyethylene A, 5% grafted, deacetylated polyethylene from Example 15 | 392 |

Example 24

Grafting of 4-Acetoxystyrene on Ethylene/Methyl Acrylate Copolymer

The purpose of this Example was to prepare a polyolefin graft polymer by grafting 4-acetoxystyrene on ethylene/methyl acrylate copolymer.

Copolymer A (Optema® TC-110, a copolymer of ethylene and methyl acrylate, 21 wt % methyl acrylate, Exxon-Mobil, Irving Tex.) (50 g) was dissolved in 500 mL of chlorobenzene at 125° C. under a nitrogen atmosphere with stirring. Then, 2 g of 4-acetoxystyrene (DuPont Electronic Polymers, Dallas, Tex.), was added. After 15 min, a premixed solution containing 2 g of t-butyl peroxide initiator in 20 mL of chlorobenzene was added drop-wise over a 70 min period. Stirring and heating at 125° C. were continued for 6 h. The highly viscous mixture was heated to approximately 95° C., and then poured into 2 L of methanol to precipitate the polymer. After air drying, the polymer was dried in a vacuum oven with nitrogen purge overnight at 70° C., after which the polymer remained in the oven without heat for 12 days. The grafted polymer had a net weight of 50.76 g.

To remove unreacted monomer and initiator, and ungrafted acetoxystyrene homopolymer, 40.0 g of the grafted polymer was placed in 500 mL of tetrahydrofuran under reflux at 67° C. The polymer softened but did not completely dissolve. After cooling, the grafted polymer was washed with 200 mL of fresh solvent and then filtered. After air drying, the polymer was dried in a vacuum oven with nitrogen purge overnight at 70° C. The net weight of the polymer was 37.14 g. By $^1$H NMR in THF-d8, the level of acetoxystyrene in this polymer was found to be 0.3 mol %.

Example 25

Deacetylation of 4-Acetoxystyrene Grafted on Ethylene/Methyl Acrylate Copolymer The purpose of this Example was to deacetylate the 4-acetoxystyrene on the grafted polymer prepared in Example 24 to give a hydroxystyrene grafted polymer.

The grafted, extracted polymer from Example 24 (30.0 g) was dissolved in 800 mL of tetrahydrofuran at reflux. Then, 100 mL of a 3 N aqueous sodium hydroxide solution was added, turning the liquid hazy and gel-like. The mixture was held at 70° C. with stirring for 6 h. Then, the mixture was poured into 3 L of 10% aqueous hydrochloric acid, immediately precipitating to a rubbery mass. The mass was broken up and allowed to continue acidifying for 4.5 h. The solids were filtered and washed several times with deionized water until the wash water reached a pH of 6. After air drying, the solids were dried in a vacuum oven with nitrogen purge over the weekend at 70 to 80° C. The net weight of the solids was 29.76 g. $^1$H NMR in THF-d8 indicated that all of the acetoxystyrene groups had been deacetylated to hydroxystyrene by this procedure. The amount of hydroxystyrene in the polymer was determined to be 0.3 mol %.

Examples 26-31

Peel Strength Testing of the Adhesion of Grafted Ethylene/Methyl Acrylate Copolymer to Metals The purpose of these Examples was to demonstrate the improved adhesion of grafted, deacetylated ethylene/methyl acrylate copolymer to metals.

The grafted, deacetylated polymer from Example 25 was melt pressed at 230° C. with a 1 min hold time to produce a 1.32 mm thick, 10 cm×10 cm film. After cutting into 2.54 cm×10 cm strips, the films were repressed against 2.54 cm×10 cm clean substrates of aluminum, carbon steel, and copper, leaving a tab of film for T peel testing. The peel strengths were measured as described in Examples 3 and 4. The results of the measurements are summarized in Table 5. As can be seen, the peel strength of the grafted polymer was significantly higher than that of the ungrafted polymer in most cases.

TABLE 5

Peel Strengths of Grafted Ethylene/methyl acrylate Copolymer to Metal Substrates

| Example | Polymer | Metal | Peel Strength, g/cm | Peel Strength, After Water Treatment g/cm |
|---|---|---|---|---|
| Example 26 | Grafted Copolymer A | Aluminum | 3031 | 1614 |
| Example 27, Comparative | Copolymer A | Aluminum | 354 | nd[1] |
| Example 28 | Grafted Copolymer A | Carbon Steel | 1772 | 0 |
| Example 29, Comparative | Copolymer A | Carbon Steel | 3583 | 161[2] |
| Example 30 | Grafted Copolymer A | Copper | 2480 | 2677 |

TABLE 5-continued

Peel Strengths of Grafted Ethylene/methyl acrylate Copolymer to Metal Substrates

| Example | Polymer | Metal | Peel Strength, g/cm | Peel Strength, After Water Treatment g/cm |
|---|---|---|---|---|
| Example 31, Comparative | Copolymer A | Copper | 354 | 0[2] |

[1] nd means not measured
[2] measured after 30 days water treatment

The samples of polymer films bonded to metal were immersed in ambient temperature water for more than 60 days. The peel strengths of these exposed samples were retested and the results are summarized in Table 5. With the exception of the carbon steel substrate, the grafted polymer retained significant adhesion after storage in water. These exposure conditions cause most polymers to fall apart from the metal substrates.

Examples 32-34

Effect of Peroxide Level on Grafting and Melt Index of Grafted Polymer

The purpose of these Examples was to demonstrate the effect of peroxide level on polymer crosslinking and grafting. Peroxide concentrations of 0.2% and 1% by weight relative to the weight of the polymer were used.

The polymers used in these Examples were Polyethylene B (Engage® 8585 ethylene/octene copolymer, density 0.885, melt index 2.5 g/10 min, DuPont-Dow Elastomers, L.L.C., Wilmington, Del.), and Polyethylene C (Engage® 8401 ethylene/octene copolymer, density 0.885, melt index 30 g/10 min, DuPont-Dow Elastomers, L.L.C.). The polymer (50 g) was dissolved in 500 mL of chlorobenzene at 125° C. under a nitrogen atmosphere with stirring. Then, 2 g of 4-acetoxystyrene (DuPont Electronic Polymers, Dallas, Tex.), was added in 10 mL of chlorobenzene. After 5 min, a premixed solution of the specified amount of t-butyl peroxide initiator (Table 6) in 20 mL of chlorobenzene was added dropwise over approximately a 1 h period. Stirring and heating at 125° C. were continued for 6 h, and the polymer was precipitated by pouring the solution into 1 L of acetone. The polymer was filtered and then washed with fresh acetone three times. After air drying, the polymer was dried in a vacuum oven with nitrogen purge overnight at 70° C.

The three grafted polymers were characterized by melt index and $^1$H NMR. The results of these measurements are summarized in Table 6. Increasing the peroxide concentration resulted in more grafting and reduced melt index.

TABLE 6

Effect of Peroxide Concentration on Grafting and Melt Index of Grafted Polymers

| Example | Polymer | t-butyl peroxide concentration wt % | Melt Index g/10 min | Mol % acetoxystyrene |
|---|---|---|---|---|
| Example 32 | Polyethylene B | 0.2 | 1.52 | 0.15 |
| Example 33 | Polyethylene B | 1.0 | 0.36 | 0.26 |
| Example 34 | Polyethylene C | 1.0 | 15.4 | 0.26 |

Example 35

Deacetylation of Grafted Ethylene/Octene Copolymer

The purpose of this Example was to deacetylate the 4-acetoxystyrene on the grafted polymer prepared in Example 34 to give a hydroxystyrene grafted polymer.

The grafted polymer from Example 34 was deacetylated and acidified according to the method of Example 2. To improve the removal of salts before drying, the polymer was ground to a particle size of less than 149 μm and washed twice with a 50/50 v/v mixture of tetrahydrofuran/deionized water at 65° C. for 30 minutes.

Examples 36-37

Peel Strength Testing of the Adhesion of Grafted, Deacetylated Polyethylene C in a PET Film Sandwich The purpose of these Examples was to demonstrate the improved adhesion of grafted, deacetylated Polyethylene C in a PET film sandwich compared to ungrafted Polyethylene C.

The grafted, deacetylated polymer from Example 35 (0.5 g) was dissolved in 10 mL of cyclohexane. A 51 μm thick, 10.2 cm×10.2 cm piece of Mylar® PET film was coated with this solution by drawing down 1 mL of solution with a cylindrical film caster with a 305 μm gap. The film was air dried and then dried in a vacuum oven with nitrogen purge at 80° C. for 2 h. The resulting coating thickness was approximately 10 μm. This coating process was repeated on a second piece of PET film. The two pieces of coated PET film were heat sealed at 220° C. with a 2 s dwell time. For comparison, this process was repeated using ungrafted Polyethylene C. The peel strength of both samples was determined as described in Examples 3 and 4. The average peel strength results are given in Table 7. The sandwich with grafted, deacetylated Polyethylene C had a significantly higher peel strength than the sandwich with ungrafted Polyethylene C. Uncoated PET films did not stick at all when heat sealed under these conditions.

TABLE 7

Peel Strength Results for Grafted, Deacetylated Polyethylene C

| Example | Polymer | Peel Strength, g/cm |
|---|---|---|
| Example 36 | grafted, deacetylated Polyethylene C | 85.8 |
| Example 37, Comparative | Polyethylene C | 32.7 |

Example 38

Grafting of a Blend of 4-Acetoxystyrene and Styrene on Ethylene/Octene Copolymer The purpose of this Example was to prepare a polyolefin graft polymer by grafting 4-acetoxystyrene and styrene on an ethylene/octene copolymer.

Polyethylene C was grafted according to the method of Example 34, except that 1 g of 4-acetoxystyrene and 1 g of styrene were added in place of 2 g of 4-acetoxystyrene. By $^1$H NMR, this grafted polymer contained 0.3 mol % total styrene. This method cannot distinguish between acetoxystyrene and styrene. FTIR confirmed the presence of acetoxystyrene in the polymer.

Example 39

Deacetylation of Acetoxystyrene/Styrene Grafted Ethylene/Octene Copolymer

The purpose of this Example was to deacetylate the acetoxystyrene/styrene grafted ethylene/octene copolymer from Example 38 to form a hydroxystyrene/styrene grafted polymer.

The grafted polymer from Example 38 was deacetylated and acidified according to the method of Example 2. To improve the removal of salts before drying, the polymer was ground to a particle size of less than 149 μm and washed three times with a 50/50 v/v mixture of tetrahydrofuran/deionized water at 65° C. for 30 min.

Examples 40-42

Peel Strength Testing of the Adhesion of Polymer Grafted with 4-Acetoxystyrene/Styrene Blend to PET The purpose of these Examples was to demonstrate the improved adhesion of acetoxystyrene/styrene grafted ethylene/octene copolymer to PET film, compared to ungrafted ethylene/octene copolymer.

The grafted, deacetylated polymer of Example 39 was solution coated onto two Mylar® PET films. The films were heat sealed and then peel tested in the same way as described in Example 36. The polymer of Example 35, grafted only with 4-acetoxystyrene and then deacetylated, was tested at the same time in the same way. Additionally, ungrafted Polyethylene C was tested in the same way for comparison. The peel strength results are summarized in Table 8. The acetoxystyrene/styrene grafted, deacetylated Polyethylene C had a higher peel strength than the acetoxystyrene grafted, deacetylated Polyethylene C. Both grafted polymers had a significantly higher peel strength than the ungrafted Polyethylene C.

TABLE 8

Peel Strength Results of the Adhesion of Grafted and Ungrafted Polyethylene C to PET Films

| Example | Polymer | Peel Strength, g/cm |
|---|---|---|
| Example 40 | grafted, deacetylated acetoxystyrene/styrene Polyethylene C | 50 |
| Example 41 | grafted, deacetylated acetoxystyrene Polyethylene C | 30 |
| Example 42, Comparative | Polyethylene C | 23 |

Examples 43-45

Peel Strength Testing of the Adhesion of Polymer Grafted with 4-Acetoxystyrene/Styrene Blend to Nylon The purpose of these Examples was to demonstrate the improved adhesion of acetoxystyrene/styrene grafted ethylene/octene copolymer to Nylon film, as compared to ungrafted ethylene/octene copolymer.

The grafted deacetylated polymer of Example 39 was solution coated onto two 76 μm thick Dartek® Nylon 66 films (DuPont Canada, Ontario Canada), the films were heat sealed and then peel tested in the same way as in Example 36. The polymer of Example 35, grafted only with 4-acetoxystyrene and then deacetylated, and the ungrafted Polyethylene C were tested at the same time in the same way. The peel strength test results are summarized in Table 9. The acetoxystyrene/styrene grafted, deacetylated Polyethylene C had a higher peel strength than the acetoxystyrene grafted, deacetylated Polyethylene C. Both grafted polymers had a significantly higher peel strength than the ungrafted Polyethylene C.

TABLE 9

Peel Strength Results of the Adhesion of Grafted and Ungrafted Polyethylene C to Nylon Film

| Example | Polymer | Peel Strength, g/cm |
|---|---|---|
| Example 43 | grafted, deacetylated acetoxystyrene/styrene Polyethylene C | 66 |
| Example 44 | grafted, deacetylated acetoxystyrene Polyethylene C | 46 |
| Example 45, Comparative | Polyethylene C | 15 |

Comparative Example 46

Peel Strength Testing of the Adhesion of a Styrene Grafted Ethylene/Octene Copolymer The purpose of this Example was to demonstrate the increased adhesion of acetoxystyrene and acetoxystyrene/styrene grafted ethylene/octene copolymer, compared to styrene grafted ethylene/octene copolymer.

Polyethylene C was grafted according to the method of Example 34 except that 2 g of styrene was added in place of 2 g of 4-acetoxystyrene. The grafted polymer was dissolved in hot tetrahydrofuran and then cooled down and precipitated to remove any unreacted styrene. By $^1$H NMR, this grafted polymer contained 0.46 mol % styrene.

The styrene-grafted polymer was solution coated onto PET and Nylon 66 films as in Examples 40-42 and Examples 43-45, respectively, heat sealed, and peel tested. On Mylar® PET film, the average peel strength was 25 g/cm, while on Dartek® Nylon 66 film, the average peel strength was 17 g/cm. Comparing these values with the results in Tables 8 and 9, indicates that grafting of styrene by itself has essentially no effect on the peel strength of polyethylene to PET or Nylon 66. However, grafting a blend of styrene and acetoxystyrene results in increased peel strength as compared with grafting with acetoxystyrene alone.

Example 47

Grafting of 4-Acetoxystyrene on High Density Polyethylene

The purpose of this Example was to prepare a polyolefin graft polymer by grafting 4-acetoxystyrene on high density polyethylene.

Polyethylene D (Alathon® H 6030 high density polyethylene, density 0.965, melt index 30, Equistar, Houston, Tex.) (50 g) was dissolved in 500 mL of chlorobenzene at 125° C. under a nitrogen atmosphere with stirring. Then, 2 g of 4-acetoxystyrene (DuPont Electronic Polymers, Dallas, Tex.), was added in 10 mL of chlorobenzene. After 5 min, a premixed solution containing 0.5 g of t-butyl peroxide initiator in 20 mL of chlorobenzene was added dropwise over approximately a 1 h period. Stirring and heating at 125° C. were continued for 4 h, and the polymer was precipitated by pouring the solution into 2 L of acetone. The polymer was filtered and then washed with fresh acetone. After air drying, the polymer was dried in a vacuum oven with nitrogen purge overnight at 70° C. The recovered weight was 50.23 g.

This grafted polymer (47 g) was mixed with 500 mL of tetrahydrofuran and heated to reflux. The mixture turned milky white, indicating that the polymer did not fully dissolve. The mixture was cooled down and vacuum filtered to recover the solids. The solids were rinsed with fresh tetrahydrofuran, air dried, and then dried in a vacuum oven with nitrogen purge overnight at 70° C. The recovered weight was 46.59 g.

FTIR of an 18 μm thick film of this grafted extracted polymer contained an acetoxy carbonyl band at 1770 cm$^{-1}$ with an intensity of 0.04 absorbance units. By $^1$H NMR the polymer was found to contain 0.12 mol % of 4-acetoxystyrene.

Example 48

Grafting of 4-Acetoxystyrene on Ethylene/Acrylic Acid Copolymer

The purpose of this Example was to prepare a polyolefin graft polymer by grafting 4-acetoxystyrene on an ethylene/acrylic acid copolymer.

Copolymer B (Nucrel® AN4309, a copolymer of ethylene and acrylic acid, 21 wt % acrylic acid, obtained from E. I. du Pont de Nemours Co.) (50 g) was dissolved in 500 mL of chlorobenzene at 125° C. under a nitrogen atmosphere with stirring. Then, 2 g of 4-acetoxystyrene (DuPont Electronic Polymers, Dallas, Tex.), was added in 10 mL chlorobenzene. After 5 min, a premixed solution containing 0.5 g of t-butyl peroxide initiator in 20 mL of chlorobenzene was added dropwise over approximately a 1 h period. Stirring and heating at 125° C. were continued for 4 h, and the polymer was precipitated by pouring the solution into 2 L of acetone. The polymer was filtered and then washed with fresh acetone. After air drying, the polymer was dried in a vacuum oven with nitrogen purge overnight at 70° C.

The grafted polymer (20 g) was mixed with 500 mL of acetone and refluxed for 1 h. Upon cooling, the solids were filtered, rinsed with fresh acetone, allowed to air dry, and then dried in a vacuum oven with nitrogen purge overnight at 70° C. FTIR analysis confirmed the presence of a small band at 1769 cm$^{-1}$ due to acetoxystyrene. By $^1$H NMR, the amount of acetoxystyrene in the polymer was determined to be 0.11-0.13 mol %.

Example 49

Deacetylation of Grafted 4-Acetoxystyrene on Ethylene/Acrylic Acid Copolymer

The purpose of this Example was to deacetylate the 4-acetoxystyrene on the ethylene/acrylic acid grafted polymer prepared in Example 48 to give a hydroxystyrene grafted polymer.

The grafted polymer from Example 48 (18 g) was mixed with 83 mL of deionized water and 7 mL of ammonium hydroxide solution (28-30% ammonia) and heated to reflux.

After 90 min, the polymer was completely dispersed. FTIR analysis of the polymer showed that the acetoxy group had been removed in this process, leaving hydroxystyrene on the polymer. Refluxing was continued for approximately 10 h. The resulting aqueous dispersion may be used in the coating of various substrates.

What is claimed is:

1. A process for making polyolefin graft polymers having improved adhesion properties comprising the steps of:
   a) contacting at least one polyolefin dissolved in a solvent with:
      i) a first phenolic ester monomeric compound having the structure as shown in Formula (I):

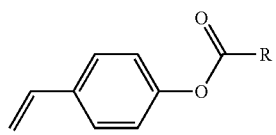

Formula (I)

wherein R=an alkyl group having from 1 to 20 carbon atoms, or phenyl;
   (ii) a second monomeric compound selected from the group consisting of styrene, diene monomers, acrylate monomers, and methacrylate monomers; and
   (iii) a radical initiator to form a reaction mixture;
   for a time and at a temperature sufficient to permit polymerization and the formation of a polyolefin graft polymer comprising a phenolic ester; said at least one polyolefin being selected from the group consisting of polyethylene, ethylene/propylene copolymer, ethylene/butene copolymer, ethylene/hexene copolymer, ethylene/octene copolymer, polypropylene, ethylene/methyl acrylate copolymer, ethylene/acrylic acid copolymer, ethylene/methacrylic acid copolymer, and ethylene/vinyl acetate copolymer;
   b) deacylating the phenolic ester comprised within the polyolefin graft polymer.

2. A process according to claim 1 wherein the deacylation is effected by a method selected from the group consisting of saponification, acid-catalyzed transesterification, and base-catalyzed transesterification.

3. A process according to claim 1 wherein the concentration of radical initiator in the reaction mixture is from about 0.1 wt % to about 4.0 wt % relative to the weight of the polyolefin polymer.

4. A process according to claim 1 wherein the reaction mixture of step (a) is heated at a temperature of at least about 60° C.

5. A process according to claim 4 wherein the reaction mixture is heated to a temperature of about 60° C. to about 180° C.

6. A process according to claim 1 wherein the reaction is terminated by cooling the reaction mixture to a temperature of less than about 70° C.

7. A process according to claim 6 wherein the reaction is terminated after at least about 6 hours.

8. A process according to claim 1 wherein the radical initiator is selected from the group consisting of benzoyl peroxide, dicumyl peroxide, 2,5-dimethyl-2,5-di-(t-butylperoxy)hexane, α,α'-bis(t-butylperoxy)diisopropylbenzene, di-t-amyl peroxide, di-t-butyl peroxide, 2,5-dimethyl-2,5-di-(t-butylperoxy)hexyne-3,1,1-di-(t-butylperoxy)-3,3,5-trimethyl-cyclohexane, n-butyl 4,4-bis(t-butylperoxy)valerate, and ethyl 3,3-di-(t-amylperoxy)butyrate.

9. A process according to claim 1 wherein the first phenolic ester monomeric compound is para-acetoxystyrene.

10. A process according to claim 1 wherein the concentration of the first phenolic ester monomeric compound and the second monomeric compound in the reaction mixture is from about 4 wt % to about 20 wt % relative to the weight of the polyolefin polymer.

11. A process according to claim 1 wherein the solvent is an inert organic solvent.

12. A process according to claim 1 wherein the solvent is selected from the group consisting of chlorobenzene, dichlorobenzene, halogenated hydrocarbons, and polar aprotic solvents.

13. A process for making polyolefin graft polymers having improved adhesion properties comprising the steps of:
   a) contacting at least one polyolefin in a first solvent with a first phenolic ester monomeric compound having the structure as shown in Formula (I):

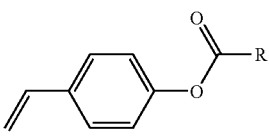

Formula (I)

wherein R=an alkyl group having from 1 to 20 carbon atoms, or phenyl and a second monomeric compound selected from the group consisting of styrene, diene monomers, acrylate monomers, and methacrylate monomers, to form a reaction mixture;
   b) contacting the reaction mixture of step (a) with a radical initiator selected from the group consisting of benzoyl peroxide, dicumyl peroxide, 2,5-dimethyl-2,5-di-(t-butylperoxy)hexane, α,α'-bis(t-butylperoxy) diisopropylbenzene, di-t-amyl peroxide, di-t-butyl peroxide, 2,5-dimethyl-2,5-di-(t-butylperoxy)hexyne-3,1,1-di-(t-butylperoxy)-3,3,5-trimethyl-cyclohexane, n-butyl 4,4-bis(t-butylperoxy)valerate, and ethyl 3,3-di-(t-amyl peroxy)butyrate;
   c) heating the mixture of step (b) from about 60° C. to about 180° C. for a time sufficient to permit polymerization and the formation of a polyolefin graft polymer comprising a phenolic ester;
   d) cooling the mixture of step (c) to a temperature of less than about 70° C.;
   e) precipitating the mixture of step (d) in a second solvent;
   f) separating the first solvent and the second solvents from the precipitated mixture of step (e); and
   g) deacylating the phenolic ester comprised within the polyolefin graft polymer.

14. A process according to claim 13 wherein the concentration of polyolefin in the first solvent is about 10 wt/vol-%.

15. A process according to claim 13 wherein the concentration of radical initiator in the reaction mixture is from about 0.1 wt % to about 4.0 wt % relative to the weight of the polyolefin polymer.

16. A process according to claim 13 wherein the at least one polyolefin is selected from the group consisting of polyethylene, ethylene/propylene copolymer, ethylene/butene copolymer, ethylene/hexene copolymer, ethylene/octene copolymer, polypropylene, ethylene/methyl acrylate copolymer, ethylene/acrylic acid copolymer, ethylene/methacrylic acid copolymer, and ethylene/vinyl acetate copolymer.

17. A process according to claim 13 wherein the first phenolic monomeric compound is para-acetoxystyrene.

18. A process according to claim 13 wherein the concentration of the first phenolic ester monomeric compound and the second monomer compound in the reaction mixture is from about 4 wt % to about 20 wt % relative to the weight of the polyolefin polymer.

19. A process according to claim 13 wherein the first solvent is selected from the group consisting of chlorobenzene, dichlorobenzene, halogenated hydrocarbons, and polar aprotic solvents.

20. A process according to claim 13 wherein the second solvent is selected from the group consisting of alcohols, ethers, ketones, esters, amides and mixtures thereof.

21. A process according to claim 1 wherein the second monomeric compound is styrene.

22. A process according to claim 13 wherein the second monomeric compound is styrene.

* * * * *